United States Patent [19]

Katz et al.

[11] 4,045,587

[45] Aug. 30, 1977

[54] FOODSTUFF FLAVORING METHODS AND COMPOSITIONS

[75] Inventors: Ira Katz, Elberon; Alan O. Pittet, Atlantic Highlands; Richard Arnold Wilson, Monmouth Beach; William John Evers, Long Branch, all of N.J.

[73] Assignee: International Flavors & Fragrances Inc., New York, N.Y.

[21] Appl. No.: 2,667

[22] Filed: Jan. 13, 1970

[51] Int. Cl.$^2$ .............................................. A23L 1/22
[52] U.S. Cl. ................................ 426/533; 260/347.2; 426/535
[58] Field of Search ................. 99/140 R; 260/347.8; 426/533

[56] References Cited

U.S. PATENT DOCUMENTS

| 2,594,379 | 4/1952 | Barch .................................... 99/140 |
| 3,455,702 | 7/1969 | Willhalm ................................ 99/140 |
| 3,697,295 | 10/1972 | van den Ouweland et al. ... 99/140 R |
| 3,904,655 | 9/1975 | van den Ouweland .......... 260/347.8 |

*Primary Examiner*—Sidney Marantz
*Attorney, Agent, or Firm*—Brooks, Haidt, Haffner & Delahunty

[57] ABSTRACT

Processes for obtaining food flavoring materials and for preparing foodstuffs comprising heating at least one conjugated oxygen-containing carbonyl compound such as a hydroxyfuranone, a hydroxylactone, or a hydroxypyrone in the presence of hydrogen sulfide to obtain hearty flavoring compositions, particularly compositions having meat and cheese flavors; together with the compositions so obtained.

24 Claims, No Drawings

FOODSTUFF FLAVORING METHODS AND COMPOSITIONS

BACKGROUND OF THE INVENTION

This disclosure relates to the preparation and use of compositions for flavoring foodstuffs, together with the compositions so produced.

In the preparation and distribution of foodstuffs, it is frequently desirable to enhance flavor and aroma notes which may be missing from a natural product or which may be altered when a natural product is processed for distribution or storage. Thus, it is well known that canned meats often lack desirable flavor characteristics of the fresh products. Moreover, it is frequently desirable to prepare foods which are tasteful and appetizing but which do not contain any, or all, of the natural products which they emulate. An example of this is a dietetic food which avoids the presence of a particular meat product and yet has the agreeable taste of such product. Further, much effort is currently directed toward providing high-protein foods which will simulate the flavor, and perhaps even the appearance, of the natural product, while utilizing protein from a less expensive source. An instance of this would be the use of deflavorized fish meal for the preparation of broths, gravies, and similar nutritions, highprotein products.

There are a number of flavoring compositions presently known and on the market, but it is always desirable to have additional flavoring materials which can be used to shade or vary a particular flavor or aroma. Also, some of the products presently available either are not capable of fully simulating a desirable meat or other flavor, or else they lack certain flavor and aroma characteristics so that the consumer feels that the product is inferior.

THE INVENTION

The present invention provides processes and material for agreeably altering the flavor of foodstuffs. Briefly, the invention comprises heating with hydrogen sulfide under superatmospheric pressures and at elevated temperatures at least one conjugated cyclic carbonyl compound having the formula

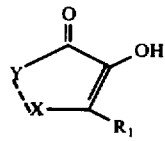

wherein the dashed line is a single bond or a carbon-carbon double bond and Y is —$CR_3R_4$—, —O—, or =$CR_3$—. When the dashed line is a single bond, and Y is —$CR_3R_4$— then X is —O— or —$CR_2R_5$. When the dashed line is a single bond and Y is —O— then X can only be —$CR_2R_5$. When the dashed line is a carbon-carbon double bond, X is =$CR_2O$— and Y is =$CR_3$—. $R_1$, $R_2$, $R_3$, $R_4$, and $R_5$ are the same or different and are alkyl or hydrogen. As more fully disclosed hereinafter, the parameters of the foregoing reaction can be varied to obtain a wide range of appealing, hearty flavors and/or aromas. The compositions obtained by such processes are also contemplated herein.

The processes according to the present disclosure can be used to provide seared meat-like flavor character; meaty egg-like flavor; roast meat flavor; sweet, heavily cooked meat flavor; various roasted flavor notes, meat juice flavor notes; gravy flavor; chicken, turkey, or other poultry flavors; braised meat flavors; smoked bacon flavors; pot roast flavors; onion-like fried meat flavors; certain cheese flavor and aroma notes; certain green, horseradish and onion type flavor and aroma notes; and like hearty aromas and flavors. It will be appreciated by those skilled in the art that the flavor and aroma of foodstuffs are inextricably intertwined so that the two go together to provide an overall organoleptic impression. It will accordingly be understood that the process of this invention can also alter both flavor and aroma of foodstuffs. It has been found in the practice of the present invention that the gamut of flavors can be varied by controlling the concentration of the reaction product in the foodstuff, the foodstuff or other substrate in which they are tasted and/or smelled, and the reaction conditions under which, and reactants from which, they are formed.

It will be appreciated from the foregoing formula and the subsequent disclosure herein that the present invention utilizes a homo- or heterocyclic conjugated carbonyl compound. More specifically, a hydroxyfuranone, a maltol, a hydroxycyclopentenone (the enol form of a cyclopentadione) or a hydroxylactone containing a carbon-carbon double bond in conjugation with the carbonyl moiety is contemplated. Thus, the hydroxyfuranone is a substance having the formula

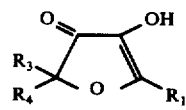

wherein $R_1$, $R_3$, and $R_4$ are as set forth above.

The substituents on the hydroxyfuranone can be varied according to the particular flavor desired. The lower alkyl or alkylene groups are desirable in the practice of this invention, particularly those having up to three carbon atoms. More specifically, the 4-hydroxy-2,5-dimethyl-3(2H)-furanone; 4-hydroxy-2,5-diethyl-3(2H) furanone; 4-hydroxy-2,5-dipropyl-3(2H)-furanone; 2-hydroxy-2-methyl-3(2H)-furanone, 4-hydroxy-5-methyl-3(2H)-furanone; 4-hydroxy-2-ethyl-5-methyl-3(2H)-furanone; and 4-hydroxy-2-methyl-5-ethyl-3(2H)-furanone are useful. In some aspects of the invention the 2,5-dimethlhydroxyfuranone is preferably utilized.

Further variation in the flavor can be obtained by using a hydroxypyrone having the formula

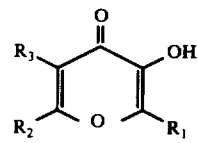

whrein $R_1$, $R_2$, and $R_3$ are as set forth above. In certain desired aspects of the present invention, $R_1$ is a lower alkyl having up to about three carbon atoms, preferably methyl or ethyl, and $R_2$ and $R_3$ are each hydrogen. Thus, maltol (3-hydroxy-2-methyl-4-pyrone) and ethylmalto (2-ethyl-3-hydroxy-4-pyrone) give excellent results.

Further conjugated cyclic compounds for use in the practice of this invention include hydroxycyclopentenones having the formula

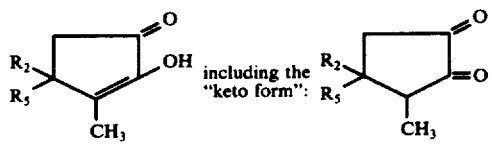

wherein $R_2$ and $R_5$ are hydrogen or lower alkyl having up to about three carbon atoms, as set forth above. In preferred aspects of the present invention $R_2$ and $R_5$ are hydrogen.

Further conjugated cyclic compounds for use in the practice of this invention include hydroxy lactones containing a carbon-carbon double bond which is conjugated with the carbonyl double bond, having the formula:

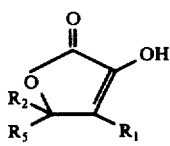

wherein $R_1$, $R_2$ and $R_5$ are hydrogen or lower alkyl having up to three carbon atoms. In a preferred aspect of this invention, $R_1$ is methyl, $R_2$ is ethyl and $R_5$ is hydrogen. This compound is commonly known as "abhexone".

In order to obtain useful results, the reaction conditions and the proportion of sulfur-containing material to the cyclic compound are controlled. When the molar ratio of the sulfur-containing material is too high, very unpleasant flavors and aroms are obtained. By contrast, when insufficient quantities of the sulfur material are utilized, very bland or sweet fruity flavors are obtained, and the products have no use for the hearty flavors within the scope of the present invention. Accordingly, the molar ratio of hydrogen sulfide to conjugated cyclic compound desirably lies between 0.05:1 and 3:1. In many instances optimum results are obtained with a molar ratio of $H_2S$ to cyclic compound of 0.1:1 to 1.2:1.

The heating is desirably carried out in water or other aqueous media, although other reaction media such as propylene glycol, ethanol, glyceride oils, and the like can be used. The concentraiton of conjugated cyclic compound in the reaction medium can be varied over a relatively wide range, although at excessively low concentrations of cyclic compound the flavor will be barely discernible and cannot readily be added to a foodstuff to obtain a desirable result. In such instances, the reaction product would have to be considerably concentrated prior to use. If the concentration of cyclic compound is too high, difficulty will be encountered in assuring good contact of the hydrogen sulfide with the compound due to solubility, dispersion, or emulsification problems. Thus, the concentration of cyclic compound in the reaction medium can range from 0.01 moles per liter to 0.5 moles per liter.

It is believed that hydrogen sulfide is an active participant in the formation of the flavoring materials, but hydrogen sulfide itself need not be used. In fact, in preferred embodiments of the invention it has been found easier to control the quantity of hydrogen sulfide in small batches by producing the hydrogen sulfide in situ from organic sulfur-containing materials or inorganic materials, which are capable of yielding hydrogen sulfide under the reaction conditions. Suitable inorganic materials are ammonium or alkali metal sulfides. Preferred materials include sodium and potassium sulfide.

The pH of the reaction is controlled as further described hereinafter.

Surprisingly, the necessary sulfur for the reaction can be supplied by a wide variety of sulfur-containing organic materials. The precise mechanism by which these materials provide hydrogen sulfide, if such is the case, is not entirely known, but it has been found that the correct quantity of material for use in the reaction can be computed by assuming that all of the sulfur present in the organic material goes to form hydrogen sulfide. Accordingly, when such organic sulfur materials are utilized, their amount is determined upon the basis that they form $H_2S$ under the reaction conditions.

The organic sulfur compounds contemplated herein are sulfur-containing substances including sulfides, disulfides, thiols, aminothiols, carboxythiols, and heterocyclic thia compounds. The materials particularly useful in the practice of this invention should contain a relatively high ratio of sulfur, oxygen and/or nitrogen atoms to carbon atoms. It has been found that when long carbon chain sulfur-containing organic materials are used, the products have undesirable "chemical" flavors and aromas. Thus, furfuryl mercaptan having the formula

2-mercaptoethanol, methyl thioglycolate having the formula

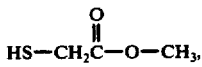

3-mercapto-1,2-propanediol, D,L-homocysteinethiolactone having the formula

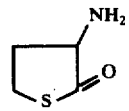

1,3-propanedithiol, acetylmethyl disulfide, 4-methyl-5-(β-hydroxyethyl) thiazole having the formula

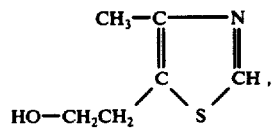

2-thiolacetic acid, and reduced glutathione having the formula

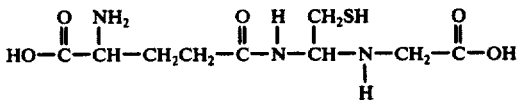

give very good results and permit facile control over a wide range of flavors, as illustrated hereinafter. On the other hand, heptyl mercaptan, benzenethiol, o-toluenethiol, methylheptyl sulfide, butyl disulfide, thiourea, and cysteine hydrochloride provide various undesirable waxy, chemical, sweet, or burned flavors when reacted with hydroxyfuranone under the herein-described conditions.

The heating is carried out at elevated temperatures in order to produce desirable flavors. Generally, it is desirable that the reaction temperature be at least the boiling temperature of water, and that it not exceed about 200° C. At temperatures substantially lower than set forth herein, there is either little production of useful flavor or else inordinately long periods of heating are required. At substantially higher temperatures the products take on burned or unpleasant sulfurous flavors and aromas. Accordingly, it is desired that the reaction be carried out at from 100° C to 200° C. It is preferred to operate at temperatures of about 120° C to about 190° C.

Depending upon the reaction medium used, the pressure should be at least somewhat above atmospheric. Lower pressures do not conveniently permit obtaining the temperatures requied, while the use of very high pressures is unnecessary and can result in problems of controlling the reaction. Accordingly, it is desirable to carry out the present reaction at superatmospheric pressures of from about two to about ten atmospheres.

A satisfactory pH for the reaction is generally readily achieved with the preferred materials. The pH can range from moderate or weakly acidic through neutrality to weakly basic. Thus, a suitable range for pH is from the region of 4 to about 9. It will be appreciated from the following description and examples that suitable buffer materials can also be present in the reaction mixture. These buffers can be selected to provide a desired pH within the range indicated, and are conveniently the salts of stronger or weaker acids and bases as required.

The time required for the reaction is affected by temperature, pressure, the particular cyclic conjugated carbonyl compound, the organic or inorganic sulfur material or other source of hydrogen sulfide, the pH and buffer utilized, and the other parameters taught herein. Times of about 30 minutes can be used in some instances to provide good flavors, while in other cases times up to eight or more hours can be used. Accordingly, the time can range from 30 minutes to eight hours. It has been found that with the described combinations of cyclic conjugated carbonyl compound and $H_2S$, times of from one to three hours provide excellent results, so that it is generally preferred to use times of this order.

It will be understood from the present description that the reaction product can be used as is to provide a hearty flavor. If desired, the product can be concentrated by removing the water or other medium if used. Such concentration can be achieved by evaporation, distillation, chromatographic separation, and like techniques.

Thus, the present invention provides compositions for providing hearty flavors to foodstuffs including comestible liquids such as broths and other beverages. The products can be used as complete flavors, as components of flavoring compositions, and to enhance, vary, alter, modify, or improve the flavors of foodstuffs alone or in combination with other ingredients. In some circumstances when only a single flavor impression is desired or when one or more cyclic conjugated carbonyl compounds have been heated with one or more sulfur-containing compounds under the conditions described above, the reaction products can be added alone and will provide substantially the entire flavor and aroma impression to a product.

More generally, the products of this invention can be admixed with other materials to provide a flavoring composition or a flavor-enhancing composition. As used herein, a flavoring composition is one which provides substantially the entire flavor and aroma impression to a foodstuff, and a flavor-enhancing composition is one suited for addition to a natural or other product to provide only the flavor and aroma notes lacking in the original foodstuff. An example of this latter use would be addition of a flavor-enhancing composition to a vegetable beef soup to give a flavor impression more like that of freshly made soup by supplying nuances which have been destroyed or altered in processing.

Thus, the reaction products according to this invention can be combined with adjuvant ingredients as necessary to impart special characteristics. Such other ingredients include vehicles such as water, ethanol, propylene glycol, glycerol, glyceride oils and the like, and carriers such as gum arabic, tragacanth, and the like to provide a base for a spray-dried flavor composition. They also include thickeners such as alginates, carrageenen, and the like to impart a heavier body to gravies and similar products; condiments and spices such as salt, pepper, allspice, basil, capsicum extract, cloves, eugenol, garlic oil, onion oil, oregano extract, pyroligneous acid, sage oil, sodium citrate, thyme, hydrolyzed vegetable protein, and the like; encapsulating agents so that the flavor composition can be coacervated to provide microencapsulated products; coloring agents such as the approved food, drug and cosmetic colors, vegetable colors, caramel, and the like; other flavoring materials as required to provide the desired flavor impression, flavor intensifiers such as tetramethyl pyrazine and monosodium glutamate and the various nucleotides; freshness preservers and antioxidants such as ascorbic acid, propyl gallate, butylated hydroxyanisole, and butylated hydroxytoluene; and the like. It will be appreciated that only some of these materials need be added to obtain a flavoring or flavor-enhancing composition.

When used as components of flavoring compositions and flavor-enhancing compositions, it is generally desirable that the reaction products of this invention comprise from 0.5 to about 50% of the total composition, although greater or lesser amounts can be used in some embodiments. The amounts used in a particular composition will vary according to the factors as indicated above. All parts, proportions, percentages and ratios herein are by weight unless otherwise indicated.

The reaction mixtures of this invention can be incorporated into foods such as soups and soup mixes, casserole dishes, canned and frozen vegetables, animal and pet foods and other veterinary products, sauces, gravies, broths, stews, simulated meat products, dietetic products, meat spreads and dips, bakery products, as substitutes or fortifiers for meat extracts, and the like. It is generally preferred that from about 0.001 to about 1.0% of the reaction products of the present invention be comprised in the total foodstuff to be flavored. Amounts somewhat less or somwhat greater than this can also be utilized, dependent upon the particular reaction product, the foodstuff to be improved, personal preferences and local tastes, and the like.

It will accordingly be appreciated that the present invention also provides a process for altering, improving fortifying, or enhancing the flavors of a wide variety of foodstuffs. Such a process can be carried out by heating the hydroxyfuranone and sulfur material and then adding the reaction product to the food. The process can also comprise one or more steps of purifying the reaction products or concentrating them as well as admixing the reaction products with adjuvant materials as set forth above prior to admixing the reaction products with foodstuffs. In some instances, it is possible to create the reaction products in situ by adding the correct quantities of cyclic conjugated carbonyl compound and sulfur material to the flavoring composition or foodstuff. When this is done, however, the parameters noted above must be taken into consideration so that the temperature and pressure of the heating are sufficient to form the requisite reaction products. Since superatomospheric pressures are used, the food or flavoring composition is required to be heated, for example, in an autoclave, prior to use of the flavoring composition for consumption of the foodstuff.

The following Examples are given to illustrate embodiments of the invention as it is presently preferred to practice it. It will be understood that these examples are illustrative, and the invention is not to be considered as restricted thereto except as indicated in the appended claims.

EXAMPLE I

Preparation of Meat Flavor

A mixture is prepared by combining 100 mg of 4-hydroxy-2,5-dimethyl-3(2H)-furanone, 0.5 ml of a 30% aqueous solution of sodium sulfide nonahydrate, and 9.5 ml of a solution buffered to pH 6.2 with a sodium potassium monoacid phosphate buffer. The $H_2S$/furanone ratio is 0.81:1. The mixture is placed in a Parr bomb and cooked for four hours at 15 psig (2 atmospheres) and 120°-122° C. During the heating step the pressure is maintained 15 psig.

The sample is somewhat cloudy after removal from the bomb. The reaction mixture is found to have a good roast meat-like odor.

Similar results are obtained by using 2-methyl, 5-methyl, 2-ethyl-5-methyl, 2-methyl-5-ethyl, diethyl, and dipropylhydroxyfuranones

EXAMPLE II

A mixture is prepared by combining 100 mg of dimethylhydroxyfuranone with 0.1 mol of a 30% aqueous solution of sodium sulfide nonahydrate and 9.9 ml of an aqueous solution buffered to pH 6.2 with sodium potassium monoacid phosphate buffer. The $H_2S$/furaone ratio is 0.17:1. The mixture is placed in a pressure vessel and heated for four hours at 15 psig and about 120° C.

After heating is completed the vessel is cooled and the contents are found to have a roast meat-like odor.

EXAMPLE III

Two samples are prepared by dissolving 100 mg of dimethylhydroxyfuranone in 9.5 ml of a phosphate buffer having a pH of 6.2 and adding 0.5 ml of 30% aqueous sodium sulfide nonahydrate. The two samples are placed in pressure vessels and heated at about 120° C and 15 psig. The first sample is cooled to room temperature after two hours of heating and the second sample is similarly cooled after four hours of heating.

The first sample has an aroma characterized as chickenlike. roasted meat, and the second sample is characterized as having a good light roasted meat flavor.

EXAMPLE IV

Mixtures are prepared by combining 100 mg of the 2,5-dimethylhydroxyfuranone with a sufficient amount of the material listed in Table I to liberate sufficient $H_2S$ to provide a mole ratio of $H_2S$/cyclic compound of 0.81:1 (assuming liberation of all available sulfur as $H_2S$), and sufficient aqueous 6.2 pH sodium potassium monohydrogen phosphate buffer to make 10 ml. All samples are heated at 120° C and 15 psig for four hours.

Evaluation of the reaction product obtained is set forth in Table I.

|    | Sulfur Compound | Flavor Obtained |
|----|---|---|
| A. | Furfuryl mercaptan | Heavy horseradish |
| B. | 2-Mercaptoethanol | French-fried onion |
| C. | Methyl thioglycolate | Eggy, hard boiled egg |
| D. | 3-Mercapto-1,2-Propanediol | Good rich pot roast |
| E. | D,L-4-homocysteine thiolactone HCl | Braised meat, gravy top note |
| F. | 4-Methyl-5-($\beta$-hydroxyethyl)-thiazole | Brothy, meaty |
| G. | Glutathione, reduced | Good veal, boiled beef |

EXAMPLE V

The procedure of Example IV is repeated utilizing the sulfur-containing materials shown in Table II. These materials are used in an amount sufficient to liberate sufficient $H_2S$ to provide a ratio of 0.08:1 rather than the ratio of Example IV. The results are shown in Table II.

|    | Sulfur Compound | Flavor Obtained |
|----|---|---|
| A. | 1,3-Propanedithiol | Initially chicken, later good meat. |
| B. | Acetylmethyl disulfide | Limburger, cheese |
| C. | Thiolacetic acid | Very good meaty |

EXAMPLE VI

Six tubes are prepared by admixing 100 mg of a cyclic conjugated compound as shown in Table III below with 9.5 ml of a pH 6.2 phosphate buffer, and 0.5 ml of a 30 percent aqueous solution of sodium sulfide nonahydrate. The tubes are sealed and heated under 15 psig for four hours. The tubes are then cooled and the resulting reaction products are evaluated.

The results of the evaluations are as shown in Table III.

TABLE III

| Tube | Cyclic Compound | Flavor Obtained |
|---|---|---|
| A. | 2,5-dimethyl-4-hydroxy-3(2H)-furanone | Good meat note |
| B. | 4-hydroxy-5-methyl-2,3-dihydrofuranone-3 | Roasted meat, lighter than A. |
| C. | Maltol | Broth-like meat note |
| D. | Ethyl maltol | Very good beef gravy |
| E. | Cyclotene | Light smoked bacon, very good roasted meat. radish and onion notes. |
| F. | Abhexone | Very good green, horse-radish and onion notes. |

EXAMPLE VII

Sufficient gum arabic is added to a roast meat-flavor reaction product as produced in Example I to provide a 1:1 ratio of gum arabic to solids in the aqueous reaction product. The composition is spray dried to produce a beef-flavored product.

EXAMPLE VIII

A beef bouillon cake formulation is made containing the ingredients listed, in the amounts shown:

| Ingredient | Gms/Unit |
| --- | --- |
| Salt | 1.80 |
| The spray dried flavor of Example VII | 0.50 |
| Gelatin (180 bloom) | 0.40 |
| Tetramethyl Pyrazine | 0.20 |
| Brown coloring | 0.01 |
| Garlic powder | 0.04 |
| Pepper, ground | 0.01 |

A bouillon cube will weigh from 4 to 5 grams. One cube is used with 6 ounces of boiling water.

This is repeated with product F in Example IV, to provide cubes giving a good broth flavor.

EXAMPLE IX

The procedure of Example VII is repeated utilizing a product prepared in the same manner as product G in Example IV. A boiled beef flavoring material is obtained.

EXAMPLE X

A gravy is made by formulating a gravy flavor composition of the ingredients and in the amounts indicated:

| Ingredient | Gms/Unit |
| --- | --- |
| Cornstarch | 10.50 |
| The spray dried product of Example VII | 3.00 |
| Caramel color | .30 |
| Garlic powder | |
| White pepper | .05 |
| Salt | 1.92 |
| Monosodium glutamate | .20 |

To one unit of gravy flavor concentrate, eight ounces of water is added, and the mixture is stirred thoroughly to disperse the ingredients, brought to a boil, simmered for one minute, and served. This "meatless" gravy has an excellent meaty flavor.

EXAMPLE XI

A soup is made by adding 22 ounces of water to the formulation of Example X for the gravy.

EXAMPLE XII

A shaker composition for enhancing the flavor of meats is prepared from a variety of flavors. A powdered composition to enhance a ham flavor is made of:

| Ingredient | % Composition |
| --- | --- |
| Ham spices | 2.5 |
| Monosodium glutamate, fine grind | 2.5 |
| Salt, fine grind | 55.0 |
| The spray dried flavor of Example VII | 40.0 |

EXAMPLE XIII

A beef noodle soup is prepared by mixing together:

| Ingredient | Gms/Unit |
| --- | --- |
| Salt | 5.00 |
| The spray dried flavor of Example IX | 3.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for five minutes, and is then ready to serve.

What is claimed is:

1. A process comprising heating in solution at least one cyclic carbonyl compound having the formula

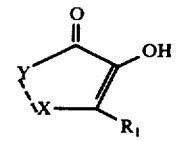

wherein the dashed line is a single bond or a carbon-carbon double bond; Y is —O—, —CR$_3$R$_4$— or =CR$_3$—; X is —O— or —CR$_2$R$_5$— when the dashed line is a single bond and Y is —CR$_3$R$_4$—; X is —CR$_2$R$_5$— when the dashed line is a single bond and Y is —O—; X is =CR$_2$—O— when the dashed line is a double bond, and Y is =CR$_3$— when the dashed line is a double bond; R$_1$, R$_2$, R$_3$, R$_4$, and R$_5$ are the same or different and are lower alkyl or hydrogen; with hydrogen sulfide in the molar ratio of sulfide to carbonyl compound of from about 0.05:1 to about 3:1 under a pressure of from about two to ten atmospheres to produce a hearty flavoring material, said solution being substantially free of esters of hydroxy polybasic acids.

2. A process according to claim 1 wherein the temperature is from 100° C to 200° C.

3. A process according to claim 1 wherein the temperature is 120° C to 190° C.

4. A process according to claim 1 wherein the molar ratio of sulfide to furanone is from 0.1:1 to 1.25:1

5. A process according to claim 1 wherein the pH is from 4 to 9.

6. A process according to claim 1 wherein the hydrogen sulfide is provided by at least one alkali metal or ammonium sulfide.

7. A process according to claim 1 wherein the dashed line is a single bond and X is —O—.

8. A process according to claim 7 wherein R$_1$ is lower alkyl.

9. A process according to claim 7 wherein R$_1$ is methyl.

10. A process according to claim 1 wherein the dashed line is a double bond and X is =CR$_2$—O—.

11. A process according to claim 10 wherein R$_1$ is a lower alkyl having up to three carbon atoms, R$_2$ is methyl, and R$_3$ is hydrogen.

12. A process according to claim 10 wherein R$_1$ is methyl or ethyl, R$_2$ is hydrogen or methyl, and R$_3$ is hydrogen.

13. A process according to claim 1 wherein the dashed line is a single bond, X is —C(R$_2$R$_5$)—, and R$_1$, R$_2$, R$_3$, R$_4$ and R$_5$ are hydrogen or lower alkyl having up to three carbon atoms.

14. A process according to claim 1 wherein the dashed line is a single bond, X is —CR$_2$R$_5$—, Y is —O—, R$_1$ is methyl, R$_2$ is ethyl and R$_5$ is hydrogen.

15. A process according to claim 13 wherein R$_1$ is methyl and R$_2$, R$_3$, R$_4$ and R$_5$ are hydrogen.

16. A process according to claim 1 wherein the hydrogen sulfide is provided by furfuryl mercaptan, 2-mercapto-ethanol, methyl thioglycolate, 3-mercapto-1,2-propanediol, D,L-homocysteinethiolactone, 1,3-propane-dithiol, acetylmethyl disulfide, 4-methyl-5-hydroxyethyl-thiazole, 2-thiolacetic acid, or glutathione.

17. A process according to claim 1 wherein an aqueous reaction medium is additionally present.

18. A flavoring material produced according to the process of claim 1.

19. A process for flavoring foodstuffs which comprises combining with a foodstuff the product obtained by the process of claim 1.

20. A process according to claim 19 wherein the reaction medium is added to the foodstuff in association with a carrier.

21. A flavored foodstuff obtained according to the process of claim 19.

22. The process of claim 9 wherein $R_3$ is methyl and $R_4$ is hydrogen.

23. The process of claim 9 wherein $R_3$ and $R_4$ are each hydrogen.

24. A process according to claim 1 wherein the dashed line is a single bond; Y is —O— or —$CR_3R_4$—; and X is —$CR_2R_5$—; $R_1$, $R_2$, $R_3$, $R_4$, and $R_5$ are the same or different and are lower alkyl or hydrogen.

* * * * *